United States Patent
Lobo et al.

(10) Patent No.: US 7,784,042 B1
(45) Date of Patent: Aug. 24, 2010

(54) DATA REORDERING FOR IMPROVED CACHE OPERATION

(75) Inventors: Sheldon M. Lobo, Cary, NC (US); Fu-Hwa Wang, Saratoga, CA (US)

(73) Assignee: Oracle America, Inc., Redwood City, CA (US)

(*) Notice: Subject to any disclaimer, the term of this patent is extended or adjusted under 35 U.S.C. 154(b) by 1173 days.

(21) Appl. No.: 11/271,012

(22) Filed: Nov. 10, 2005

(51) Int. Cl.
*G06F 9/45* (2006.01)

(52) U.S. Cl. ............... 717/159; 717/151; 717/153; 717/154

(58) Field of Classification Search ............... 717/106
See application file for complete search history.

(56) References Cited

U.S. PATENT DOCUMENTS

2004/0128662 A1* 7/2004 Eisenberg et al. ........... 717/159

OTHER PUBLICATIONS

Brad Calder et al., "Cache-Conscious Data Placement", Oct. 1998, Eighth International Converence on Architectural Support for Programming Languages and Operating Systems, pp. 1-11.*
Peter Druschel, "12 Introduction to Storage Allocation", Comp 421—Spring '00.*
Allen Tucker, "Computer Science Handbook", 2004, Chapman & Hall/CRC, Second Edition, p. 18-11.*
Craig Douglas, "Cache Designs and Tricks", Nov. 2004, http://web.archive.org/web/*/www.mgnet.org/~ douglas/Classes/cs521-s00/cache/cache.ppt.*
Mazen Kharbutli et al., "Eliminating Conflict Misses Using Prime Number-Based Cache Indexing", May 2005, IEEE Transactions on Computers, vol. 54, No. 5, pp. 573-586.*

* cited by examiner

*Primary Examiner*—Wei Y Zhen
*Assistant Examiner*—Lanny Ung
(74) *Attorney, Agent, or Firm*—Osha • Liang LLP

(57) ABSTRACT

Techniques for reordering the data section of a computer program are provided for improving the run-time performance of the program. A computer program that comprises a data section and a code section is compiled. After the computer program has been compiled, the data section of the computer program is reordered based at least on annotation information that is included in a plurality of object files that represent the object code of the program. A specific binary file that is a specific executable version of the computer program is generated. The specific binary file includes the data section of the computer program that has been reordered. The data section of the computer program may be reordered during the linking of the plurality of the object files. Alternatively, the data section may be reordered after the computer program has been linked into a first binary file by rewriting the first binary file into the specific binary file.

22 Claims, 7 Drawing Sheets

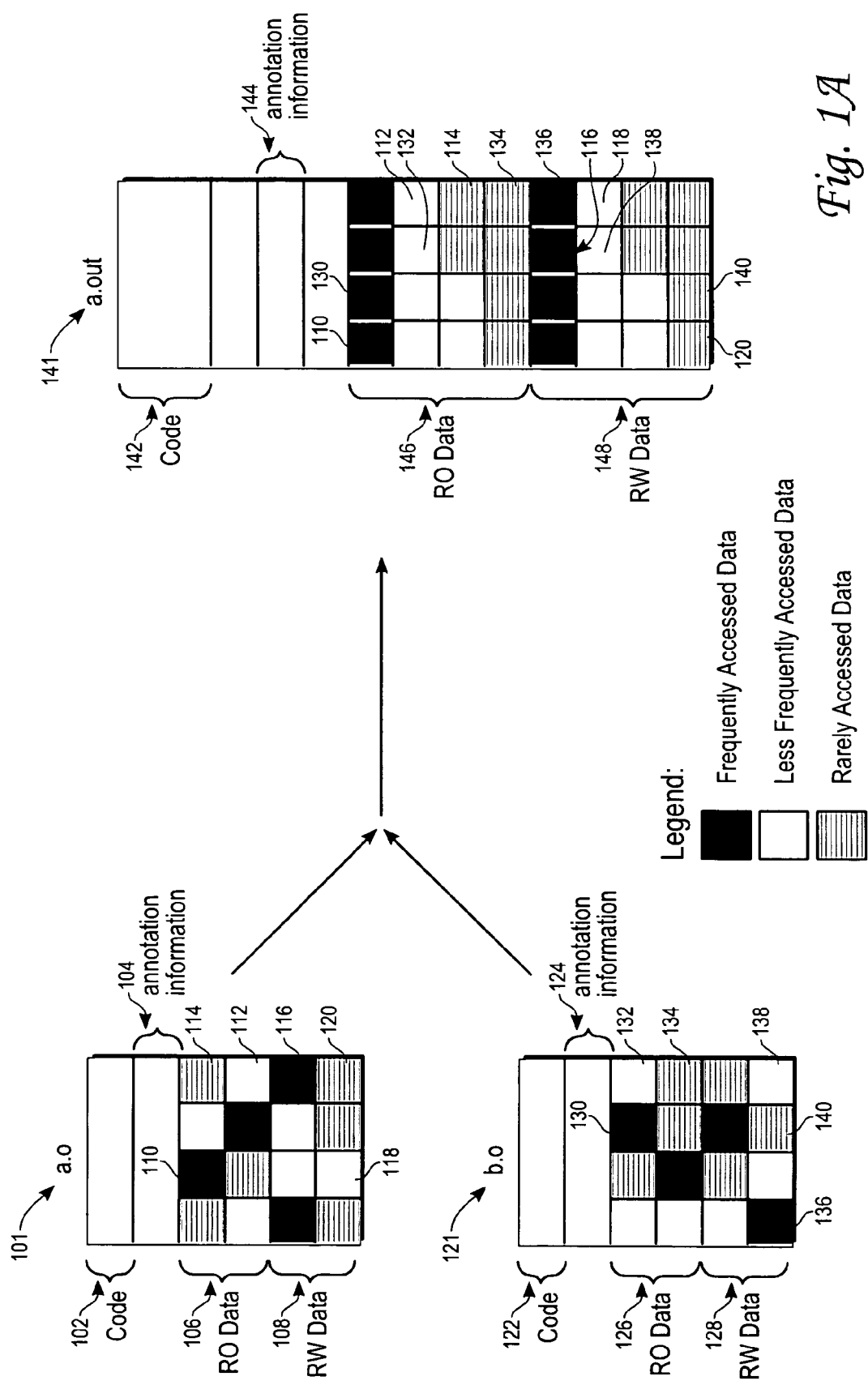

DATA REORDERING FOR IMPROVED CACHE OPERATION

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Most software applications are written by multiple developers in a modular manner. Typically, different teams of software developers write the source code of different modules of a software application. The source code from individual modules is then compiled by a compiler into object code modules. A linker then links all object code modules into a binary file. As referred to herein, a binary (or executable) file is a file that includes the set of executable instructions for a computer program, such as, for example, a software application.

Typically, an object code module includes a data section for storing the data variables that are being accessed by the instructions in that particular module. A data variable as referred to herein is any data that may be referred to or accessed by an instruction. While some compilers may order the data variables within an object code module in an optimal way, any such optimization is not very efficient because each module only holds a fraction of all data variables used by the computer program. Furthermore, since the different source code modules are compiled separately, at the compilation step a more efficient ordering of data variables, such as ordering that accounts for data variables outside of a single module, cannot be performed.

At the linking step, the linker typically has only a high level view of the object code modules being linked. The linker simply concatenates the data sections of all object code modules and assigns virtual addresses to all instructions and data variables that are stored in the resulting binary file. While the linker recognizes the different sections in each object code module, the linker usually does not go further than just figuring out which sections from which object code modules to concatenate. Specifically, the linkers typically are not capable of performing fine-grained optimizations at the individual data variable and instruction level.

The arrangement of data variables in the data section of a computer program, however, may have a significant impact on the run-time performance of the program.

For example, most modern processors (central processing units, or CPUs) provide processor caches. A processor cache, such as, for example a Level 1 (L1) or Level 2 (L2) cache, is a storage area configured for fast access by a processor where frequently executed instructions and/or frequently accessed data are kept. Typically, a processor cache is logically divided into sections, or cache lines, where each cache line corresponds to a range of cache addresses. In order to provide for more efficient operation, a processor typically loads information into the processor cache an entire cache line at a time. Instead of loading individual instructions or data variables, a processor fetches from memory and stores in the processor cache the contents of a range of memory addresses, where the contents of a particular range of memory addresses is always loaded into a particular cache line of the processor cache. When the processor needs to fetch an instruction or a data variable from memory, the processor first checks the processor cache to see if the instruction or data variable is stored there. When the desired instruction or data variable is found in the cache, a cache hit is said to occur; when the desired instruction or data variable is not found in the cache, a cache miss is said to occur. During the execution of a computer program, a high processor cache hit ratio for instructions and/or data variables results in a faster and more efficient execution; a high processor cache miss ratio on the other hand results in a slower or sub-optimal execution.

Because of the fixed relationship that exists between virtual addresses, physical addresses, and cache addresses, the virtual addresses assigned to data variables in the data section of a computer program determine to a large extent whether or not particular data variables are going to be found in the processor cache during the execution of the computer program. However, a linker that links the object modules of the computer program typically does not assign virtual addresses to the data variables in a manner that results in an optimal placement of the data variables. When the computer program is executed, such non-optimal placement of data variables usually results in processor cache misses, which impede the run-time performance of the computer program.

One approach to address this issue is providing linkers with features to order data sections based on user input (typically represented as a mapfile). In this approach, a compiler is required to fragment data into individual data sections when the compiler compiles a source code module into an object code module. The user can then instruct the linker to place these fragmented data sections in a particular manner that is defined in a mapfile. The disadvantage of this approach is that the creation of a reasonably good mapfile is an extremely tedious process. Further, it is extremely unlikely that a user would know which set of data variables cause processor cache misses. In addition, this approach cannot take into account the interactions between instructions and data variables, and how such interactions may affect cache misses in processor caches that allow caching of both instructions and data variables.

SUMMARY

To improve the run-time performance of a computer program, techniques are provided for reordering the data section of the computer program. By reordering the data variables allocated space in the data section of the computer program, processor cache clashes are minimized or completely avoided during the execution of the computer program. The reordering is performed by assigning virtual addresses to the data variables and storing the reordered data section in a binary file that represents an optimized executable version of the computer program.

In one embodiment, a computer program that comprises a data section and code section is compiled. After the computer program has been compiled, the data section of the computer program is reordered based at least on annotation information that is included in a plurality of object files that represent the object code of the computer program. A specific binary file that includes the reordered data section of the computer program is then generated to represent the optimized computer program. The reordering of the data section of the computer program is performed after the computer program is compiled when a global view of all data variables in all object files of the computer program is available. In this manner, optimal layout of all data variables from all object files may be achieved in the data section of the computer program.

In one embodiment, the reordering of the data section of the computer program is performed by re-linking the plurality of object code files that represent the object code of the computer program. A linker reorders the data variables in the data section and generates a binary file representing the computer program with the reordered data section. In one embodiment, the reordering of the data section of the computer program is performed on the data variables stored in the data section of a linked binary file that represents a particular executable version of the computer program. After reordering the data variables, the binary file is re-written to reflect the reordered data section of the computer program.

In one embodiment, the reordering of the data variables in a data section of a computer program is based at least on annotation information and profile information. The annotation information is included in the plurality of object files that represent the object code of the computer program. The annotation information describes the structure of the computer program and may indicate, among other things, the boundaries of the different portions of the computer program (such as functions and basic blocks) and the location of specific instructions within the code section of the computer program. The profile information comprises one or more counters that are associated with one or more portions of the computer program. A binary file representing an executable version of the computer program is instrumented by inserting instrumentation instructions in the different portions of the computer program. When the instrumentation instructions are executed as part of executing the instrumented binary file in a train run, the instrumentation instructions increment the profile counters associated with the corresponding portions of the computer program. When the train run is completed, a profile counter would indicate the number of times a particular portion of the computer program has been executed during the run. Based on control flow information generated from the annotation information, the profile counters associated with the portions of the computer program are then accurately propagated to the data variables referenced in each portion, and an access frequency associated with each data variable is determined.

In one embodiment, the data variables in the data section of a computer program are reordered based at least in part on the access frequency of each data variable. For example, the data variables may be grouped according to access frequency and may be assigned contiguous virtual addresses. In another example, a determination may be made whether two or more variables are related based on annotation information and the access frequencies of the two or more variables. If it is determined that the two or more variables exhibit temporal locality, the two or more variables may be assigned virtual addresses which would guarantee that two or more variables are going to be placed on the same processor cache line when the computer program is executed. In another example, a data variable may be assigned a virtual address which would guarantee that a processor cache clash would not occur between the data variable and an instruction that references the data variable when the instruction is executed.

BRIEF DESCRIPTION OF THE DRAWINGS

FIG. 1A is a block diagram illustrating an example of reordering a data section in a binary file during linking according to an embodiment.

DETAILED DESCRIPTION OF EMBODIMENT(S)

General Overview

Figure 1B:
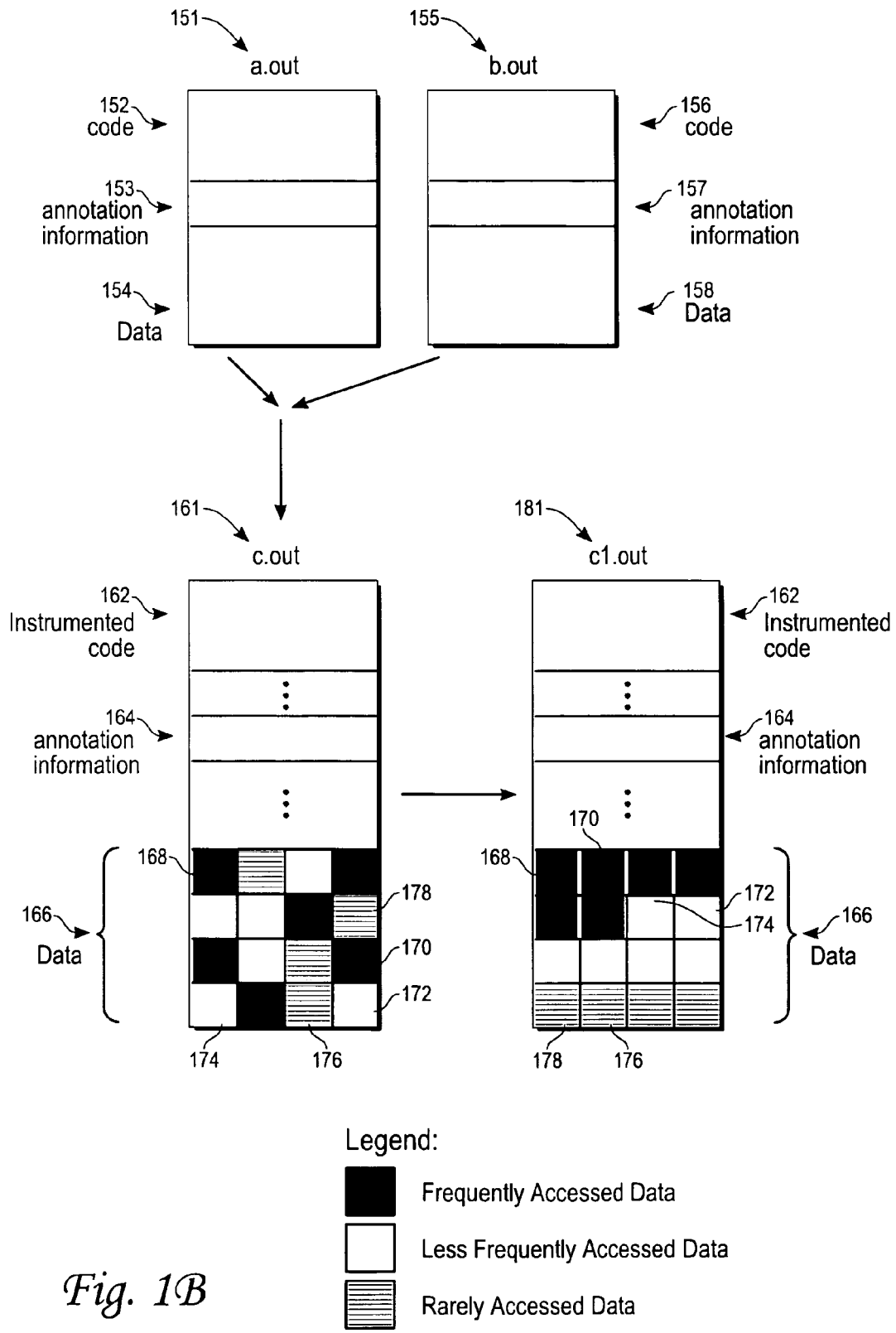
FIG. 1B is a block diagram illustrating an example of reordering a data section in a binary file after the binary file has been linked according to an embodiment.

Techniques for reordering the data section of a computer program in an optimal manner are described herein. To achieve optimal layout of the data variables in the data section, the techniques for data reordering described herein are performed after the computer program has been compiled and a global view of all data variables in all modules of the computer program is available. For example, the techniques described herein may be performed by a linker at link-time when the executable instructions and data variables from all object code modules of the program are available. The linker reorders the data variables and then generates a binary file representing the computer program with the reordered data section. In another example, the techniques described herein may be performed at post-link-time by a special software application or tool that is capable of reordering the data variables stored in the data section of a linked binary file that represents a computer program. After reordering the data variables, the software application re-writes the binary file to reflect the reordered data section of the computer program.

A data variable as referred to herein is any data in a binary file that may be referred to or accessed by an instruction stored in the file. Examples of data variables that exist in a binary file include, but are not limited to, global program variables, static and local program variables, constant program data, floating point program variables, and switch statement tables. The techniques described herein provide for reordering some or all data variables that are stored in a binary file representing a computer program in order to achieve optimal processor cache performance during the execution of the computer program.

To decide how to place the data variables in order to achieve optimal data layout, the techniques described herein provide for using annotation information and profile information about the computer program in which the data variables are included. Annotation information is generally information that describes the structure of the computer program. For example, the annotation information may comprise information indicating the boundaries of one or more portions of the program such as functions and basic blocks and/or information indicating individual instructions within the code section of the computer program. Profile information is generally counters that indicate how many times an individual portion or an instruction of the computer program is executed when the program is executed in a train run. In order to generate profile information, the code section of the computer program is first instrumented. (As referred to herein, instrumentation is the process of inserting instrumentation instructions into a set of source or executable code.) Once instrumented, the computer program is executed with a training workload, and the instrumentation instructions, when executed, increment the profile counters associated with the corresponding portions or instructions of the program.

The data reordering techniques described herein provide for reassigning the virtual addresses that are associated with individual data variables. In a binary file, a virtual address assigned to a particular data variable typically points to a space in the data section of the binary file that is reserved for storing the value of the particular data variable. A symbol table in the binary file stores a mapping between the symbolic references to data variables and the virtual address assigned to these data variables (e.g. data variable "x" is assigned virtual address "0x82000"). Typically, the space associated with the particular data variable is empty, except when the data variable is constant data that is pre-initialized and physically stored in the binary file. When the virtual address of a particular data variable is reassigned according to the techniques herein, a corresponding change is reflected in the symbol table. (If the data variable is a constant data, then the constant value stored in the binary file is physically copied to the location pointed to by the new virtual address assigned to the data variable.) In addition, when the virtual address of a data variable is reassigned, all instruction in the binary file that refer to, or access, this data variable are modified to reflect the newly assigned virtual address.

The techniques for data reordering described herein may be performed by a variety of applications. For example, a linker may be configured to perform the techniques at link-time in order to optimize binary files generated by the linker. In another example, a specialized software application, a software development kit, or any other hardware and/or software application that is capable of operating on files may be used to perform the techniques described herein post-link-time in order to optimize an already existing binary file. Thus, the techniques for data reordering described herein are not limited to being implemented by a particular type of application, and any now known or later developed software mechanisms that may execute on a wide variety of operating systems or hardware platforms may be used to implement the techniques.

Functional Overview

Figure 3A:
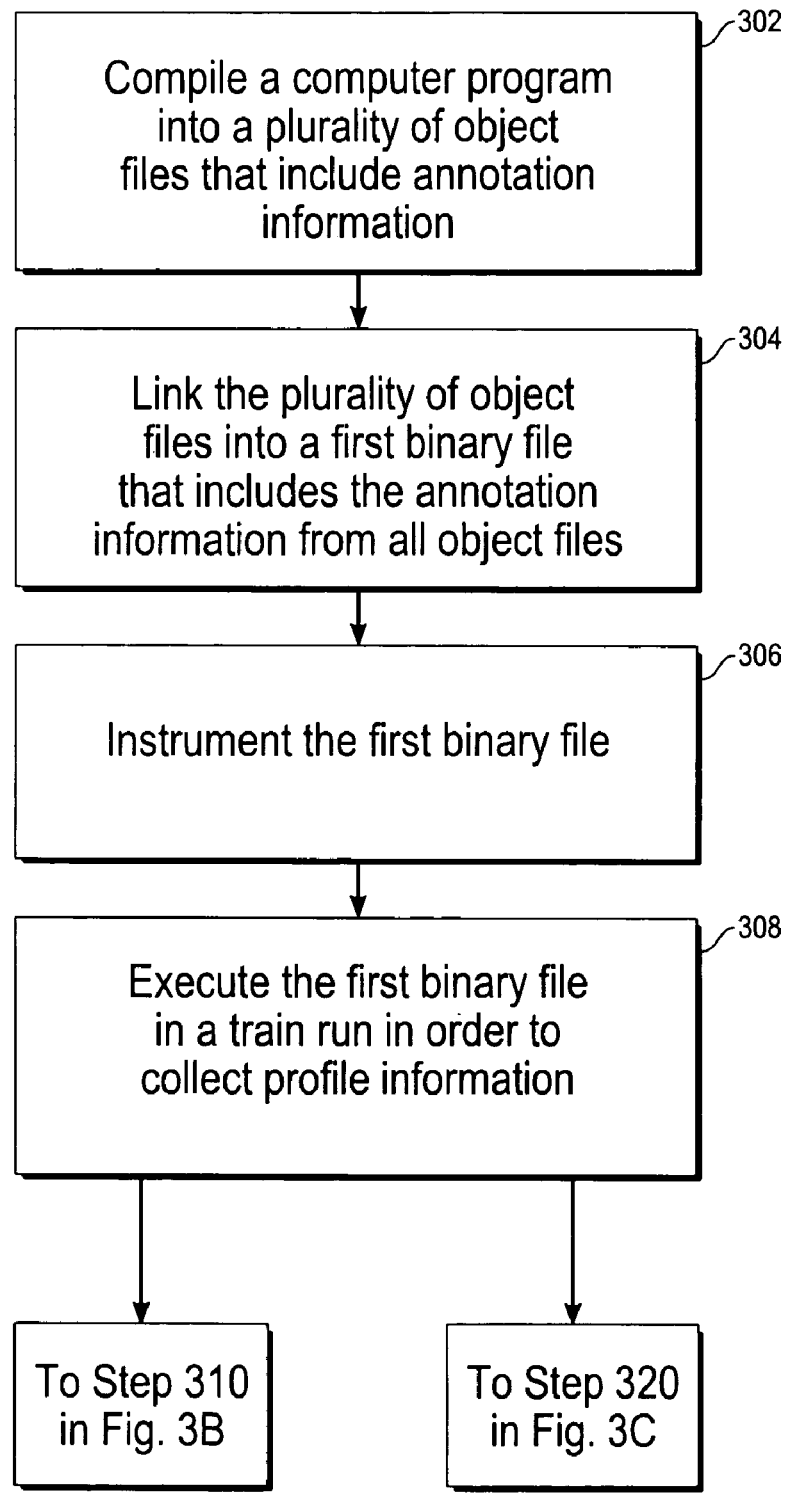
FIG. 3A is a flow diagram illustrating an example method of generating profile information in preparation for data reordering according to an embodiment.

FIG. 3A is a flow diagram illustrating an example method of generating profile information in preparation for data reordering according to one embodiment.

In step 302, the source code of a computer program is compiled into a plurality of object files. Each of the object files may comprise a data section for storing data variables, a code section that stores executable instructions, and an annotation information section that includes annotation information describing the computer program. In addition, in some embodiments the compiler may include instrumentation instructions within the source code of the computer program before compiling the source code into the plurality of object files.

In step 304, the plurality of object files of the computer program are linked into a binary file. The binary file includes a code section and a data section. The data variables stored in the data section include the data variables from all object files. The binary file also includes an annotation information section, which stores the annotation information from all object files. In step 306, the binary file is instrumented by inserting instrumentation instructions in the code section of the binary file. In embodiments in which the compiler has included instrumentation instructions in the object files during the compilation step, step 306 may not need to be performed.

In step 308, the instrumented binary file is executed in a train run with a training workload in order to collect profile information. In some embodiments, the profile information comprises counters which indicate how many times a particular instruction in a particular portion of the computer program (such as, for example, a function or a basic block) has been executed during the train run. In other embodiments, additional profile information may be collected, such as, for example, counters that indicate how many times the different portions of the computer program have been executed during the train run. The values of the different counters in the profile information are incremented when the corresponding instrumentation instructions are executed during the train run. When the execution of the train run is completed, the profile information may be exported and stored in a profile file for future use.

Figure 3B:
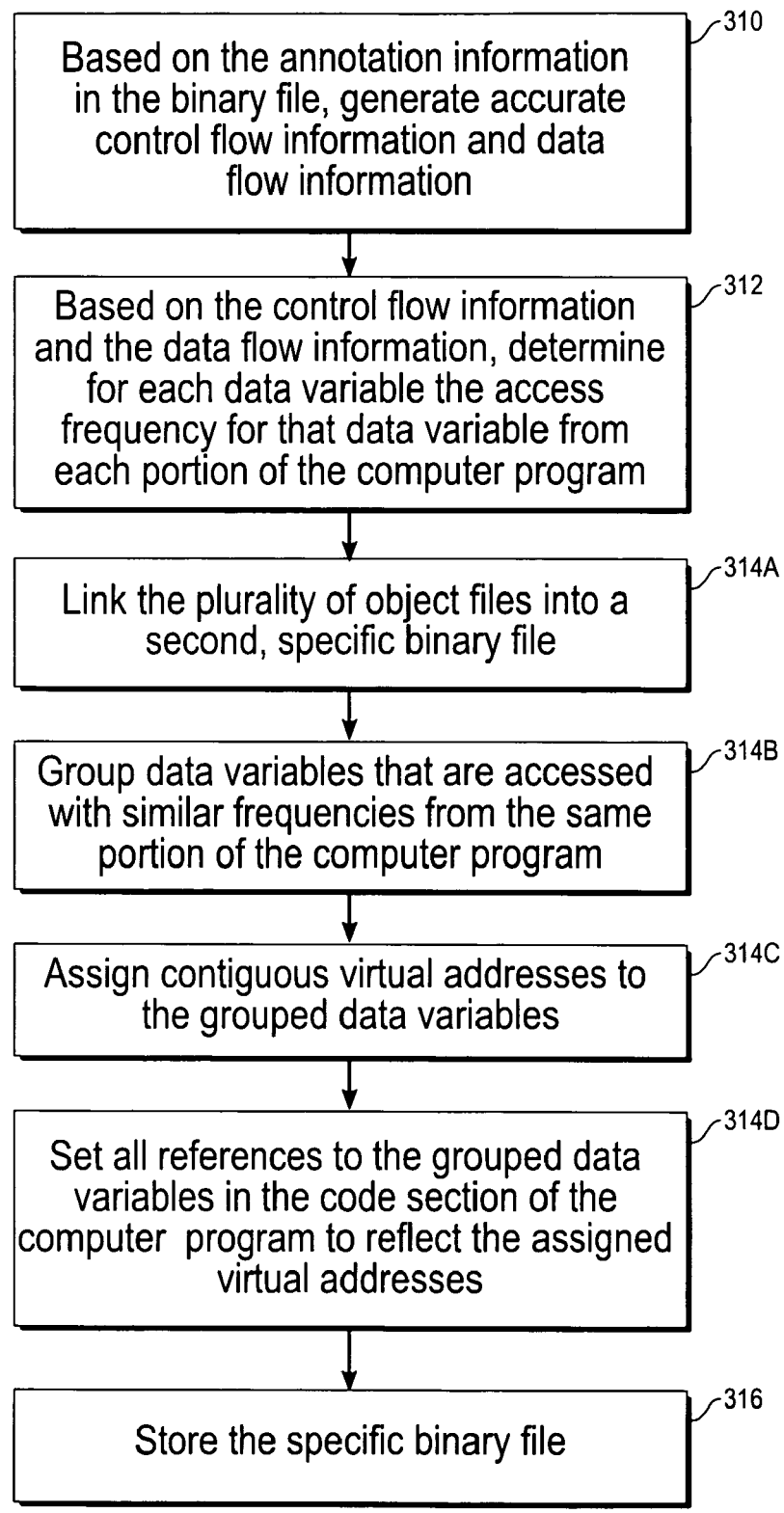
FIG. 3B is a flow diagram illustrating a method for data reordering during linking according to an embodiment.

After step 308 is completed and the profile information is collected, in step 310 depicted in FIG. 3B the profile information may be used to reorder the data variables in the data section of the computer program by re-linking the plurality of object files of the computer program into a new optimized binary file that includes the reordered data section. Alternatively, in step 320 in FIG. 3C the collected profile information may be used to reorder the data variables in the data section of the computer program by reordering the data section stored in the binary file and then re-writing the binary file to reflect the reordered data section.

FIG. 3B is a flow diagram illustrating a method for data reordering during linking according to one embodiment. In step 310, based on the annotation information stored in the binary file generated at step 304 in the FIG. 3A, accurate data flow and control flow information is generated. The annotation information, and the control flow and data flow information generated from it, are described in more detail in a separate section hereinafter.

In step 312, based on the accurate control flow and data flow information, and on the collected profile information, for each data variable in the computer program an exact access frequency, or count, is determined for that variable from each portion of the computer program. In some embodiments, an access frequency for a data variable with respect to a particular instruction or set of instructions may also be determined in a similar manner. An example mechanism for propagating collected profile counters to particular data variables is described in a separate section hereinafter.

In step 314A, the plurality of object files of the computer program are re-linked into a second, specific binary file. During, or at the end, of the linking process, the data variables in the data section of the computer program are reordered in an optimal manner by performing one or more steps, such as steps 314B, 314C, or 314D.

In step 314B, data variables that are accessed with similar frequencies from one or more of the portions of the computer program are grouped together. In addition, in some embodiments the access frequencies for two or more data variables may be used to determine whether a particular relationship, dependency, or temporal locality exists between the two or more data variables. (Temporal locality as used herein refers to a characteristic indicating that the same variables are accessed around the same time from the same portion of the computer program.) In these embodiments, any relationship, dependency, or temporal locality that is found to exist between data variables may also be used in determining how to group data variables.

In step 314C, virtual addresses are assigned to data variables that are grouped together. The virtual addresses assigned to the grouped data variables may be contiguous addresses. Various factors may be considered in order to decide what virtual addresses to assign to the different data variables. For example, in some embodiments virtual addresses are assigned in a manner which ensures that frequently accessed data variables will be placed on the same cache line in the processor cache when the computer program is executed. In another example, in some embodiments the virtual addresses assigned to the data variables are selected in a manner that ensures that the data variables and the instructions that access them will not clash in processor caches that allow storing both instructions and data, such as, for example, most L2 caches. Some of the factors which may be considered in order to determine what virtual addresses to assign to data variables are discussed in more detail in later sections hereinafter.

In step 314D, all references in the code section of the computer program to data variables which have newly assigned virtual addresses are set to reflect these newly assigned virtual addresses. For example, the linker may set the executable instructions which refer to or access data variables with reassigned virtual addresses to reflect the new virtual addresses of these data variables.

After the data variables in the specific binary file are reordered as necessary and the file is linked, in step 316 the file is stored with the data variables in the data section arranged in an optimal layout. In this manner, the binary file representing the computer program is optimized during the process of linking the plurality of object files of the program.

Figure 3C:
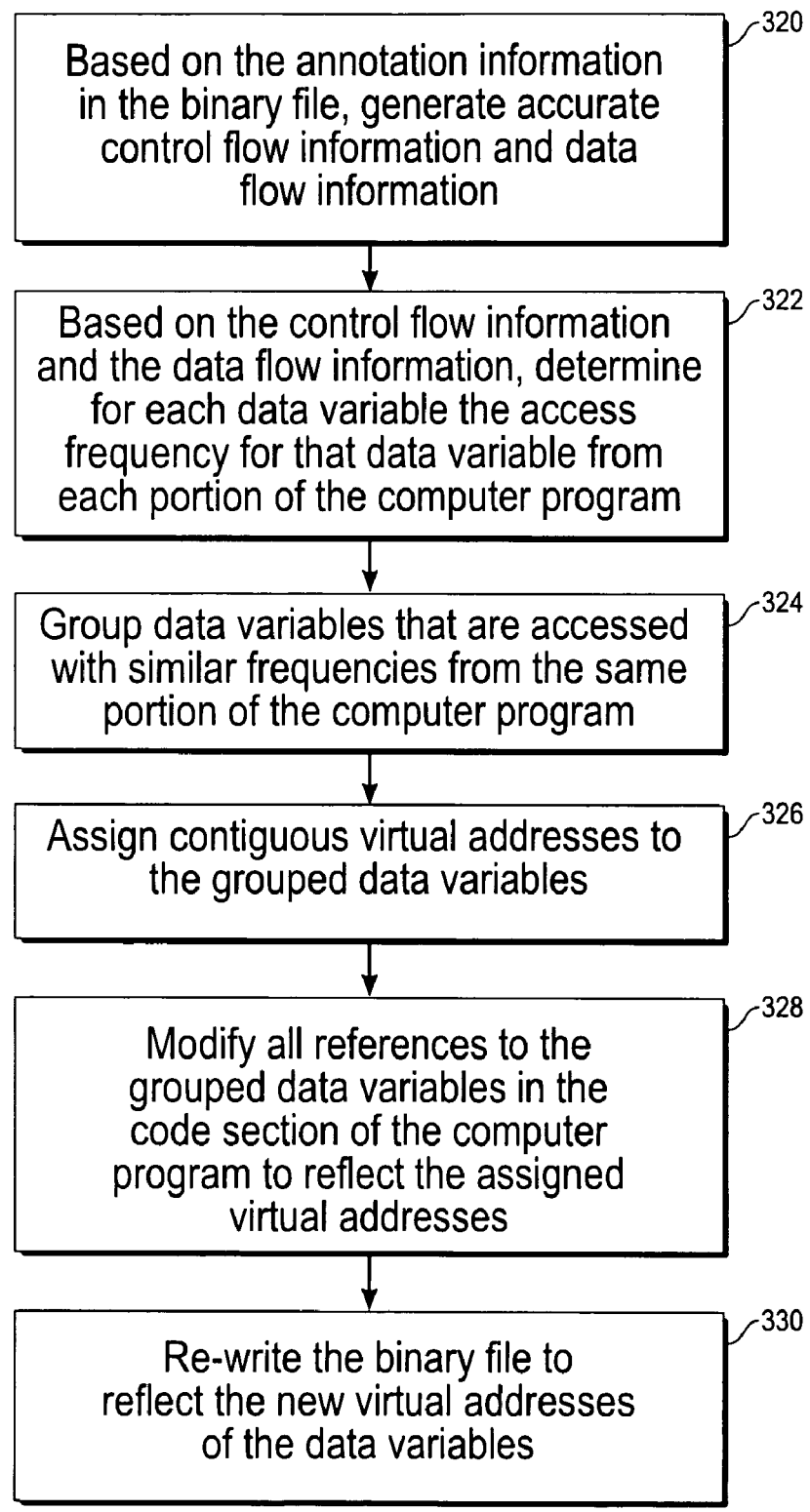
FIG. 3C is a flow diagram illustrating a method for data reordering by rewriting a binary file after the binary file is linked according to an embodiment.

FIG. 3C is a flow diagram illustrating a method for data reordering by rewriting a binary file after the binary file is linked according to one embodiment.

In step 320, based on the annotation information stored in the binary file, accurate data flow and control flow information is generated. In step 322, based on the accurate control flow and data flow information, and on the collected profile information, for each data variable in the computer program an exact access frequency, or count, is determined for that variable from each portion of the computer program. In some embodiments, an access frequency for a data variable with respect to a particular instruction or set of instructions may also be determined in a similar manner.

In step 324, data variables that are accessed with similar frequencies from one or more of the portions of the computer program are grouped together. In addition, in some embodiments the access frequencies for two or more data variables may be used to determine whether a particular relationship, dependency, or temporal locality exists between the two or more data variables. In these embodiments, any relationship, dependency, or temporal locality that is found to exist between data variables may also be used in determining how to group the data variables.

In step 326, virtual addresses are assigned to data variables that are grouped together. In some embodiments, the virtual addresses assigned to grouped data variables may be contiguous. Similarly to step 314C in FIG. 3B, various factors may be considered in order to decide what virtual addresses to assign to the different data variables.

In step 328, all references in the code section of the computer program to data variables that have newly assigned virtual addresses are modified to reflect these newly assigned virtual addresses. For example, executable instructions that refer to, or access, data variables with reassigned virtual addresses are modified to reflect the new virtual addresses of these data variables.

After the data variables in the specific binary file are reordered as necessary, in step 330 the binary file is re-written to reflect the optimal layout obtained by reordering the data variables in the data section of the computer program. In this manner, the binary file representing the computer program is optimized after the binary file is linked.

Example of Data Reordering by Re-Linking a Binary File

In one embodiment, the data sections in a plurality of object files of a computer program are reordered at link-time when the object files are linked into an executable binary file. Since at link-time a linker can account for all data variables in all data sections of all object files, the reordering of data variables in the data sections is performed in view of the entire program. At the same time, the techniques described herein provide the linker with the ability to access the object files at a very fine-grained level. Since at compile-time the compiler has inserted annotation information in the object files, the linker is also able to discern the boundaries of the different portions of the computer program (such as, for example, functions and basic blocks). Based on profile information generated during a train run of a binary file previously generated for the computer program, the linker is also able to make determinations about the exact access frequencies with which data variables are accessed from the different portions of the computer program. (At link-time, the linker may use the symbolic references of the data variables that are stored in the symbol table in order to be able to associate a particular profile counter with a particular data variable.) Thus, since the linker is able to identify all data variables in all object files and to determine their access frequencies, the data portion of the entire computer program can be optimized for optimal behavior.

FIG. 1A is a block diagram illustrating an example of reordering a data section in a binary file during linking according to an embodiment.

Referring to FIG. 1A, object files 101 ("a.o") and 121 ("b.o") are linked to generate binary file 141 ("a.out"). During the process of linking, the data variables included in object files 101 and 121 are reordered in an optimal manner and stored in binary file 141.

Object file 101 comprises code section 102, annotation information section 104, and data sections 106 ("RO Data") and 108 ("RW Data"). Data section 106 stores the read-only data variables included in object file 101. Data section 108 stores the read-write data variables included in object file 101. Similarly, object file 121 comprises code section 122, annotation information section 124, and data sections 126 ("RO Data") and 128 ("RW Data"). Data section 126 stores the read-only data variables included in object file 121. Data section 128 stores the read-write data variables included in object file 121.

Binary file 141 comprises code section 142, annotation information section 144, read-only data section 146 (for storing read-only data variables), and read-write data section 148 (for storing read-write data variables). When binary file 141 is generated, the code sections from object files 101 and 121 (sections 102 and 122, respectively) are used to generate code section 142, and the annotation information sections from object files 101 and 121 (sections 104 and 124, respectively) are used to generate annotation information section 144. Read-only section 146 is generated from read-only sections 106 and 126 in object files 101 and 121 by reordering the read-only data variables in these sections, and read-write section 148 is generated from read-write sections 108 and 128 in object files 101 and 121 by reordering the read-write data variables in these sections.

Based on annotation information included in sections 104 and 124, and on profile information collected during a train run of a binary file that was previously linked from object files 101 and 121, the frequency access for each data variable in any of data sections 106, 108, 126 and 128 is determined.

For example, as shown in FIG. 1A, section 106 in object file 101 stores some frequently accessed read-only data variables, such as data variable 110; some less frequently accessed read-only data variables, such as data variable 112; and some rarely accessed read-only data variables, such data variable 114. The section 108 in object file 101 stores some frequently accessed read-write data variables, such as data variable 116; some less frequently accessed read-write data variables, such as data variable 118; and some rarely accessed read-write data variables, such as data variable 120.

Similarly, the access frequencies of the data variables in data sections 126 and 128 in object file 121 are determined. Section 126 in object file 121 stores some frequently accessed read-only data variables, such as data variable 130; some less frequently accessed read-only data variables, such as data variable 132; and some rarely accessed read-only data variables, such data variable 134. The section 128 stores some frequently accessed read-write data variables, such as data variable 136; some less frequently accessed read-write data variables, such as data variable 138; and some rarely accessed read-write data variables, such as data variable 140.

Suppose that, based on the access frequency of each of the data variables stored in the data sections of object files 101 and 121 and on the profile and annotation information for object files 101 and 121, it is determined that read-only data variables 110 and 130 need to be placed in contiguous virtual addresses in binary file 141 in order to avoid processor cache misses when the binary file is executed. Suppose also that similar relationships are found to exist for read-only data variables 112 and 132; read-write data variables 116 and 136; read-write data variables 118 and 138; and read-write data variables 120 and 140. Suppose also that such a relationship is not found for read-only data variables 114 and 134.

When object files 101 and 121 are linked to generate binary file 141, the data variables in the read-only and read-write data sections are optimized separately. Thus, read-only data variables from sections 106 and 126 in object files 101 and 121 are reordered within read-only section 146 of binary file 141. Similarly, read-write data variables from sections 108 and 128 in object files 101 and 121 are reordered within read-write section 148 of binary file 141.

Specifically, within each of sections 146 and 148, frequently accessed data variables are placed first, less frequently accessed data variables are placed next, and rarely accessed data variables are placed last. Furthermore, when the virtual addresses are assigned to each group of data variables, care is taken to assign such contiguous virtual addresses to related data variables that the related data variables are likely to be stored in the same cache line of a processor cache.

For example, all frequently accessed read-only data variables from sections 106 and 126 in object files 101 and 121 are placed first in the read-only data section 146 of binary file 141; all less frequently accessed read-only data variables from sections 106 and 126 are placed next in section 146; and all rarely accessed read-only data variables from sections 106 and 126 are placed last in section 146. Furthermore, since particular relationships have been found to exist between read-only data variables 110 and 130, and 132 and 112, as depicted in FIG. 1A these read-only data variables are assigned contiguous virtual addresses within each of the groups of frequently accessed read-only variables and less frequently accessed read-only data variables. Since no relationship has been found to exist between read-only data variables 114 and 134, these two data variables have not been assigned contiguous virtual addresses. However, since both of data variables 114 and 134 have been determined to belong to the group of rarely accessed read-only variables, both of these two variables have been assigned virtual addresses after the virtual addresses assigned to the groups of frequently accessed read-only data variables and less frequently accessed read-only data variables.

When the data variables in the data sections of object files 101 and 121 have been reordered and assigned new virtual addresses, all references in code section 142 of binary file 141 to the reordered data variables are set to reflect the newly assigned virtual addresses.

As shown in FIG. 1A, the read-write data variables in read-write data section 148 of binary file 141 have been reordered in a similar manner. In this way, the data variables from object files 101 and 121 have been reordered during linking and have been stored in an optimal manner in binary file 141.

Example of Data Reordering by Re-Writing a Binary File

FIG. 1B is a block diagram illustrating an example of reordering a data section in a binary file after the binary file has been linked according to one embodiment.

Referring to FIG. 1B, object files 151 ("a.o") and 155 ("b.o") are linked to generate binary file 161 ("c.out"). Binary file 161 is then optimized according to the techniques described herein and the optimized version is stored under binary file 181 ("c1.out").

Object file 151 comprises code section 152, annotation information section 153, and data section 154. Data section 154 stores the data variables included in object file 151. Annotation information section 153 stores annotation information that indicates the boundaries of the functions and data blocks in object file 151, and may also store annotation information regarding specific instructions in the code section 152. Similarly, object file 155 comprises code section 156, annotation information section 157, and data section 158. Data section 158 stores the data variables included in object file 155. Annotation information section 157 stores annotation information that indicates the boundaries of the functions and data blocks in object file 155, and may also store annotation information regarding specific instructions in the code section 156.

Binary file 161 comprises code section 162, annotation information section 164, and data section 166. When binary file 161 is generated, the code sections from object files 151 and 155 (sections 152 and 156, respectively) are used to generate code section 162, and the annotation information sections from object files 151 and 155 (sections 153 and 157, respectively) are used to generate annotation information section 164. The data sections from object files 151 and 155 (sections 154 and 158, respectively) are used to generate data section 166. When data section 166 is generated, the data variables within the section are not arranged in any particular order.

Once binary file 161 is generated, the file is instrumented by inserting instrumentation instructions in code section 162. In some embodiments, the instrumentation instructions may be inserted in object files 151 and 155 when the compiler compiles the source code and generates these object files. After binary file 161 is instrumented, the computer program represented by the file is executed in a run with a training workload in order to generate profile information. Typically, at the end of the train run, the profile information collected during the run is extracted and stored in a profile file for future use.

Based on annotation information included in section 164 and on profile information collected during the train run, the frequency access for each data variable in data section 166 of binary file 161 is then determined. For example, as shown in FIG. 1B, data section 166 stores some frequently accessed data variables, such as data variable 168; some less frequently accessed data variables, such as data variable 172; and some rarely accessed data variables, such data variable 176. As shown in FIG. 1B, the data variables in data section 166 are not arranged in any particular order and for this reason the layout of these data variables is less than optimal.

Suppose that, based on the access frequency of each of the data variables stored in data section 166 and on the annotation information stored in annotation information section 164, it also is determined that data variables 168 and 170 need to be placed in contiguous virtual addresses in order to avoid processor cache misses when the binary file is executed. Suppose also that similar relationships are found to exist for data variables 172 and 174, and data variables 176 and 178.

Once the access frequency of each data variable and the relationships among the data variables in data section 166 are determined, binary file 161 can be optimized by placing frequently accessed data variables first, followed by less frequently accessed data variables, and rarely accessed data variables being placed last. Furthermore, when the virtual addresses are assigned to each of these groups of data variables, care is taken to assign such contiguous virtual addresses to related data variables that the related data variables are likely to be stored in the same cache line of a processor cache. For example, as shown in FIG. 1B, frequently accessed data variables 168 and 170 are assigned contiguous virtual addresses within the address space allocated to frequently accessed data variables; less frequently accessed data variables 172 and 174 are assigned contiguous virtual addresses within the address space allocated to less frequently accessed data variables; and rarely accessed data variables 178 and 176 are assigned contiguous virtual addresses within the address space allocated to rarely accessed data variables.

When the data variables in data section 166 are reordered and assigned new virtual addresses, all references to the reordered data variables in code section 162 are modified to reflect the newly assigned virtual addresses. At this point, binary file 161 is rewritten into binary file 181 ("c1.out"). In some embodiments, the resulting binary file that stores the reordered data section may overwrite the binary file that is being optimized. Binary file 181 stores data section 166 in which the data variables have been arranged in an optimal manner. In this way, the data variables from binary file 161 have been reordered after binary file 161 has been linked, and have been stored in an optimal manner in binary file 181.

Annotation Information

The annotation information used by the techniques for data reordering described herein generally comprises information that expresses the structure of a computer program. The annotation information provides the capability to accurately determine the binary structure of the computer program by providing various information, such as, for example, the boundaries of the portions of the program, the existence of program data in the middle of executable code, and the location of specific instruction within the executable code.

In one embodiment, the annotation information comprises at least information that indicates the boundaries of one or more portions of the computer program. The portions of a computer program indicated by annotation information include, but are not limited to, the code and data sections of the computer program, and functions and basic blocks in the computer program. In addition, the annotation information may further include information identifying specific instructions within functions or basic blocks of the computer program. A function as referred to herein is a set of code to which flow of execution can be passed from a calling entity (such as, for example, another function), and which can return the flow of execution to the calling entity. A basic block is a set of code within a function in which execution flow always enters at the beginning of the block and finishes at the end of the block.

In one embodiment, the annotation information is inserted in the code of a computer program by a compiler, which compiles and links the code of the computer program into a binary file. The annotation information for a computer program that is stored in a binary file may include one or more of the following:

the address and size of all annotated code in a module of the computer program;

the starting address and size of each function and each basic block within each function of the computer program;

information about multiple entry points to a function (for example, information about instructions such as the Fortran ENTRY statement);

detailed control flow information for indirect branch instructions (for example, the C/C++ switch and Fortran GOTO statements);

information about any position-independent executable code addresses;

information about the location of a specific instruction in the executable code;

information about data embedded in the executable code section of the computer program;

information about indirect calls, tail calls, and calls that return a structure instruction; and information about any references to execution code addresses in the binary file.

In some embodiments, the annotation information stored in a binary file may be used to build accurate data flow and control flow information about the computer program represented in the binary file. Data flow information as referred to herein is information that tracks the values of data variables and registers at different points in the execution of a computer program. Control flow information as referred to herein is information that tracks the structural elements of the computer program and the relationships among them.

The data flow and control flow information generated based on annotation information may represent the data flow and control flow graphs of the computer program, respectively, and may be used to accurately determine the points in the computer program where instrumentation code is to be inserted in order to collect profile information. Further, the data flow and control flow information generated based on annotation information may also be used to determine which portion of a computer program is accessing which data variable (e.g. function "foo" is accessing data variable "x"), and what instructions within a portion of a computer program, such as a basic block, are accessing which data variables (e.g. an "add" instruction in a particular basic block is referencing the content of data variable "y").

Methods and techniques for creating data flow and control flow information and data flow and control flow graphs are described in detail in Alfred V. Aho, et al., *Compilers: Principles, Techniques, and Tools*, Addison-Wesley 1996, ISBN 0201100886, the entire contents of which are incorporated by reference herein.

Propagating Profile Information to Data Variables

The techniques for data reordering described herein make use of profile information that is generated during the execution of an instrumented binary file in a train run. In some embodiments, the profile information comprises counters associated with the different portions of a computer program, such as, for example, functions and basic blocks. During the train run, instrumentation instructions inserted in a portion of the computer program increment the corresponding counter each time the portion of the computer program is executed. Thus, at the end of the train run a particular counter would indicate how many times the portion of the computer program associated with the particular counter was accessed and executed during the run. In addition, the profile information may also comprise counters indicating the number of times particular instructions in particular basic blocks or functions are executed during the train run.

Based on annotation information and on profile information counters, the frequency with which a particular data variable is accessed from the executable code of a computer program can be determined. Based on the frequency of access for each data variable, the data variables in the data section of the computer program can be reordered and arranged in an optimal manner.

Figure 2:
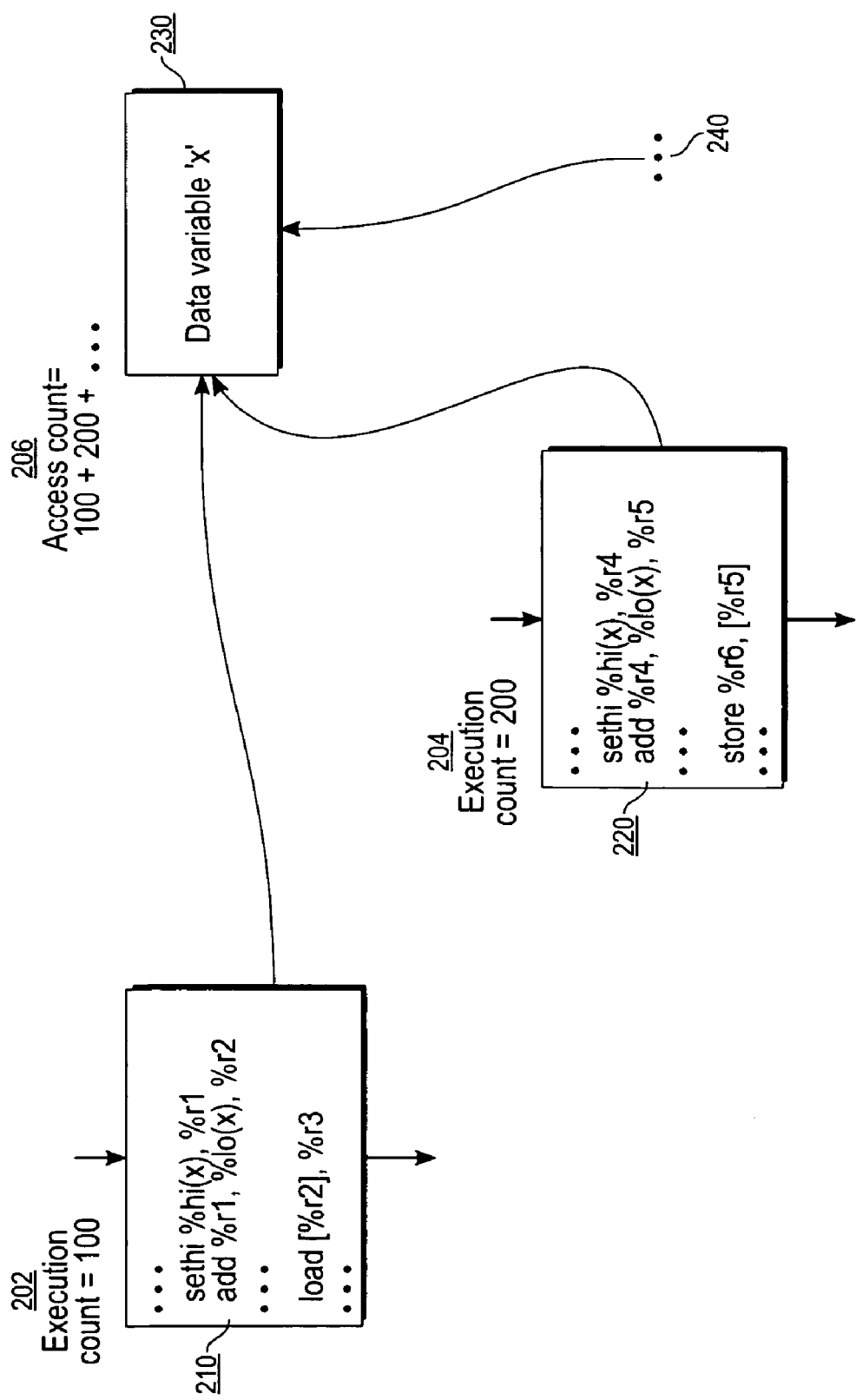
FIG. 2 is a block diagram illustrating the propagation of profile counters for a particular data variable in order to determine frequency of access according to an embodiment.

FIG. 2 is a block diagram illustrating the propagation of profile counters for a particular data variable in order to determine a frequency of access for that data variable according to an embodiment.

As depicted in FIG. 2, basic blocks 210 and 220 of a computer program both access data variable "x" 230. Within the computer program, data variable "x" 230 may also be accessed from a number of other basic blocks, which are indicated by ellipsis 240. The boundaries of basic blocks 210, 220, and any other basic blocks 240 within the computer program are accurately determined based on annotation information included in a binary file that represents the computer program.

Associated, with basic block 210 is a profile counter 202, which indicates the number of times basic block 210 was executed during a train run of the computer program. (The value of profile counter 202 is "100".) Associated with basic block 220 is a profile counter 204, which indicates the number of times basic block 220 was executed during a train run of the computer program. (The value of profile counter 204 is "200".)

When a basic block is executed during a train run, each data variable referenced by an instruction in the basic block is also accessed. Thus, a profile counter associated with a basic block is a very good indicator of the frequency with which a data variable referenced in the basic block would be accessed during normal execution. For example, profile counter 202 indicates that each data variable referenced in basic block 210 would be accessed 100 times during execution. Similarly, profile counter 204 indicates that each data variable referenced in basic block 220 would be accessed 200 times during execution.

In order to determine the access frequency 206 of data variable 230, all basic blocks accessing that data variable are first identified. Next, the profile counters associated with each of the identified basic blocks are summed up. As shown in FIG. 2, data variable "x" 230 is accessed by instructions in basic blocks 210 and 220. Thus, the access frequency count 206 of data variable 230 is the sum of profile counter 202 (value "100") and profile counter 204 (value "200"), which are associated with basic blocks 210 and 220, respectively. If data variable 230 is accessed by other basic blocks, such as basic blocks indicated by ellipsis 240, then the profile counters associated with these basic blocks are also added to the value of frequency access count 206.

The above mechanism for propagating profile counters to data variables may also be used from the perspective of a portion of a computer program that is other than a basic block, such as, for example, a function. Using the above mechanism, the access frequency of each data variable allocated space in the data section of a computer program may be determined based on profile information collected during a train run of the computer program. Once the access frequency of each data variable is determined, the data section of the computer program may be arranged to place data variables with similar access frequencies together in order to improve the execution, or run-time, performance of the computer program.

In some embodiments profile counters associated with particular portions of a computer program, such as, for example functions and basic blocks, may also be used in the manner described above to determine whether particular relationships exist among data variables (e.g. to determine whether data variable "x" and data variable "y" are most frequently accessed from function "foo"). In some embodiments, the profile information may also provide profile counters indicating the number of times particular instructions are executed during a train run. By performing data flow analysis, these embodiments may also determine which instructions load the content of which data variables. Further, the profile counters associated with the particular instructions may be propagated to the data variables by using the mechanism described above with respect to FIG. 2. Thus, the access frequency of each data variable with respect to particular instructions may also be determined, which in turn may be considered in deciding how to reorder the data variables and arranged them in a manner that would avoid processor cache clashes between data variables and instructions that access them.

Reordering Data Variables to Avoid Processor Cache Clashes

The access frequency of each data variable allocated space in the data section of a computer program may be used to reorder the data variables and to arrange the data section in an optimal manner. Arranging the data variables in an optimal manner improves the run-time performance of the computer program because it reduces the processor cache misses and the processor cache clashes when the program is executed.

In most processor architectures, processor caches are of limited size. Processor caches are typically divided into logical sections, or cache lines, where each cache line corresponds to a range of cache addresses. For example, a processor cache of 4 KB (4096 bytes) may be divided into 128 cache lines of 32 bytes: cache line 0 would store the range of cache addresses between 0 and 0031, cache line 1 would store the range of cache addresses between 0032 and 0063, cache line 2 would store the range of cache addresses between 0064 and 0095, cache line 3 would store the range of cache addresses between 0096 and 0127, and so on for the rest of the cache lines. The processor loads information into the processor cache an entire cache line at a time. A particular cache line stores the content of those ranges of memory addresses which are multiples of the cache size and are offset by the cache address range of the particular cache line. With respect to the above 4 KB processor cache, this would mean that cache line 0 would always store the content of memory address ranges 0000-0031, 4096-4127, etc., cache line 1 would always store the content of memory address ranges 0032-0063, 4128-4159, etc., cache line 2 would always store the content of memory address ranges 0064-0095, 4160-4191, etc., cache line 3 would always store the content of memory address ranges 0096-0127, 4192-4223, etc., and so on for the rest of the cache lines.

A processor cache clash is said to occur when the processor needs to swap out a cache line holding a particular data variable or instruction in order to load into the processor cache another data variable or instruction. For example, suppose that during the execution of a computer program, data variables "x" and "y" are assigned physical addresses that are offset by a value that is a multiple of the processor cache size; thus, data variables "x" and "y" will be stored in the same particular cache line in the processor cache. If data variables "x" and "y" are accessed frequently during the execution of the computer program, frequent processor cache clashes may occur because the cache line in the processor cache can store one of the data variables but not both.

The techniques described herein address processor cache clashes by providing mechanisms for assigning such virtual addresses to data variables during reordering that processor cache misses and processor cache clashes are minimized or completely avoided. For example, different embodiments may take into account a combination of one or more of the following considerations to determine the placement of data variables with respect to other data variables:

Data variables may be arranged in decreasing order of their access frequency. For example, data variables most frequently accessed may be placed first and those less frequently accessed may be placed later;

Data variables may be placed near "related" data variables. Related data variables as referred to herein are two or more data variables among which some kind of relationship exists. For example, a temporal locality may exist among data variables that are frequently accessed from the same portion of a computer program, such as, for example, a basic block, a function, or a caller-callee function level;

Data variables related to other data variables may be placed so that they would not clash in a processor cache when the computer program is executed. For example, related data variables may be arranged in a manner which would guarantee that their virtual addresses are not exact multiples of the processor cache size;

Related data variables may be placed on the same processor cache line. Further, data variables may be aligned at processor cache line boundaries in order to minimize processor cache clashes;

Data variables that are interleaved with instructions in the code section of a computer program may be moved to the data section in order to avoid polluting the instruction processor cache when the program is executed.

In some embodiments, arranging data variables based on access frequency involves assigning contiguous virtual addresses to data variables that have the same or similar access frequency. In some embodiments, the data variables may be grouped in a plurality of groups based on their access frequencies, and within each group the data variables may be assigned contiguous virtual addresses in order to minimize the chances of processor cache misses.

In some embodiments, related data variables may be identified based on annotation information and profile information. For example, from control flow information generated based on annotation information, a determination may be made that data variable "x" and data variable "y" are both accessed from a particular basic block. Further, based on profile information it may be determined that the particular basic block is executed a large number of times. Thus, a conclusion may be made that a temporal locality exists for data variables "x" and "y", and that placing these data variables in close proximity would improve the run-time performance of the particular basic block.

In some embodiments, related data variables may be assigned virtual addresses which guarantee that the related data variables are placed on the same cache line in order to avoid cache line swaps during execution. In addition, data variables may be aligned at processor cache boundaries in order to guarantee that certain data variables are going to be placed at the same cache line. For example, aligning data variables at cache boundaries may involve assigning dummy virtual addresses in order fill up the space that would be left at the end of a cache line, and assigning to the next group of related data variables virtual addresses that would place this group of data variables on the next cache line.

In some embodiments, when a computer program is compiled the compiler may interleave executable instructions with data variables. Examples of such data variables are constants in switch statements and floating point data referenced by the instructions. In these embodiments, the data variables that are interleaved with instructions may be left with the instructions or may be removed to the data section of the computer program by reordering. For example, if an interleaved data variable is in a close temporal locality to the instructions that use it, then the data variable may be left interleaved with the instructions, otherwise the data variable may be removed to the data section of the computer program.

Reordering Data Variables to Avoid Instruction—Data Variable Processor Cache Clashes Some processor architectures allow processor caches to store both instructions and data variables. A typical L2 processor cache is an example of such cache. A processor cache clash may occur in such processor caches between an instruction and a data variable referenced by the instruction. For example, if the physical address of an instruction is offset at an exact multiple of the cache size from the physical address of the data variable, both the instruction and the data variable would be assigned the same cache address and consequently would be stored in the same cache line of the processor cache. This would mean that the cache line must be swapped after the instruction is read in order to fetch the data variable on which the instruction needs to operate.

The techniques for data reordering described herein avoid such instruction—data variable cache clashes by assigning such virtual address to a data variable which would guarantee that the data variable would not clash with instructions that frequently access it. Based on annotation information and profile information, the access frequency with which a data variable is referenced by the different instructions may be determined. Typically, the instructions are assigned virtual addresses first. When the data variable is being reordered, before assigning a new virtual address to the data variable a check is performed to determine which instructions most frequently access this data variable. If the new virtual address of the data variable would cause a processor cache clash with an instruction that frequently accesses the data variable, the new virtual address of the data variable is selected at such offset from the virtual address of the instruction that a processor cache clash would not occur when the instruction is executed.

In some embodiments, one factor which may be considered when determining whether a data variable and an instruction that accesses it would clash in a processor cache is the processor cache size. For example, in order to avoid a processor cache clash, the data variable may be assigned a virtual address that is not at an offset that is exact multiple of the processor cache size from the virtual address of the instruction. Another factor which may be considered when determining what virtual address to assign to the data variable is the frequency with which a particular instruction accesses the data variable. If the particular instruction frequently accesses the data variable, then the data variable should be assigned a virtual address that would not cause a processor cache clash; however, if the particular instruction rarely accesses the data variable, then processor cache clashes between the data variable and the instruction would be rare and the data variable may be assigned any suitable virtual address.

Hardware Overview

Figure 4:
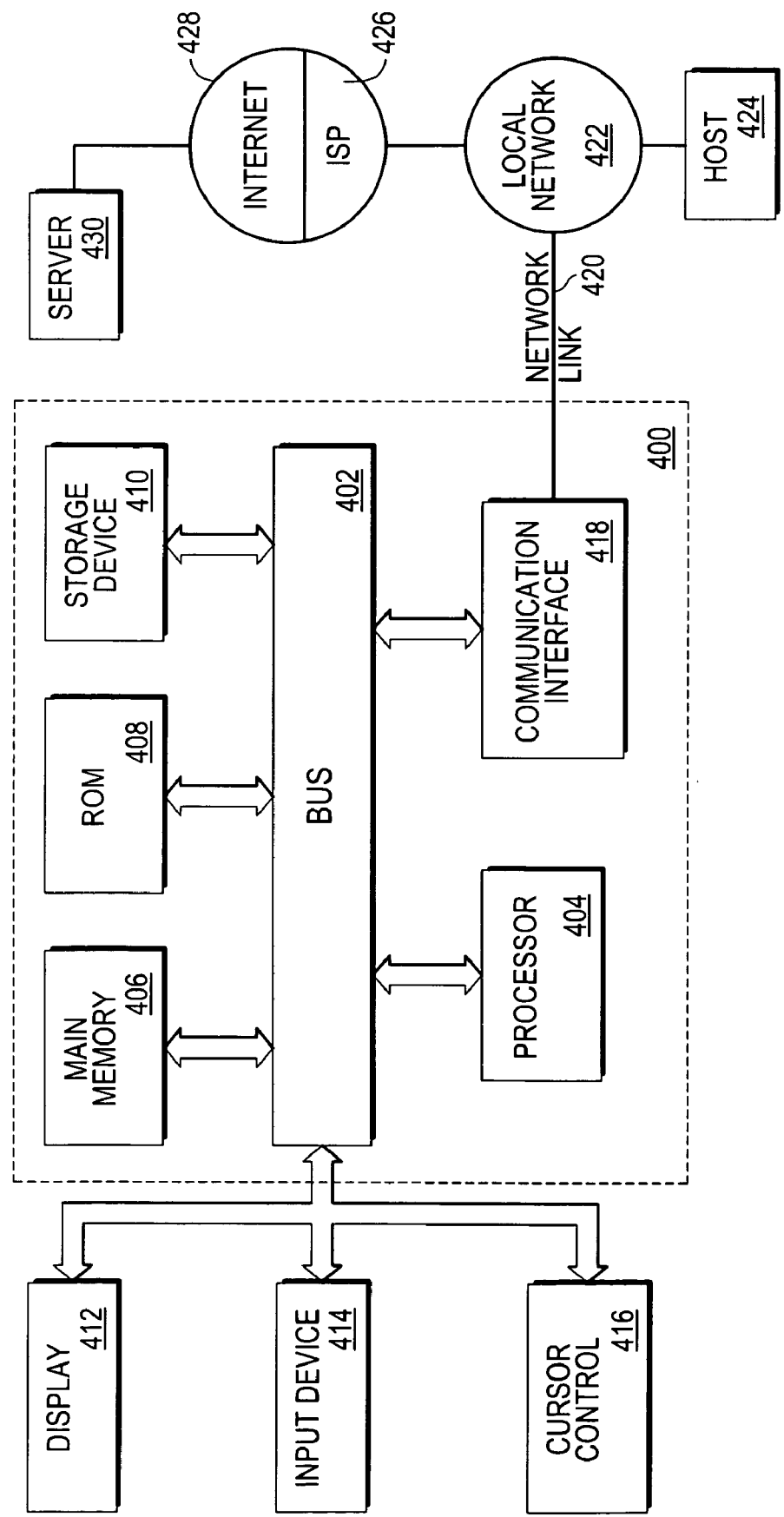
FIG. 4 is a block diagram of a general purpose computer system in which one embodiment of the present invention may be implemented.

FIG. 4 is a block diagram of a computer system 400 in which one embodiment of the present invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may further be a network connection that connects one or more of the components. Any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method for reordering a data section associated with a computer program, the method comprising:
compiling the computer program into a plurality of object files that each include annotation information;
linking the plurality of object files into a first binary file that includes the annotation information from each object file, wherein the data section of the computer program that is stored in the first binary file is not reordered;
instrumenting the first binary file;
executing the first binary file to collect profile information;
based on the annotation information in the first binary file, generating at least one of control flow information and data flow information;
based on at least one of the control flow information and the data flow information, determining for each data variable an access frequency for that data variable from each portion of the computer program;
linking the plurality of object files into a specific binary file;
reordering the data section of the computer program, wherein the reordering comprises:
grouping data variables that are accessed with similar frequency from the same portion of the computer program,
assigning contiguous virtual addresses to the grouped data variables, and
setting all references to the grouped data variables in a code section of the computer program to reflect the assigned contiguous virtual addresses; and
storing the specific binary file, after generating the first binary file, that is a specific executable version of the computer program, wherein the specific binary file includes the data section of the computer program that has been reordered, and wherein the specific executable version is different than the first executable version,
wherein the reordering is based on at least the annotation information and the profile information.

2. The method of claim 1, wherein:
the profile information comprises one or more counters associated with the one or more portions of the computer program, wherein a particular counter associated with a particular portion is incremented each time the particular portion is accessed during the execution of the first binary file; and
reordering the data section further comprises:
prior to the grouping, determining the access frequency for each data variable by summing all counters that are associated with portions of the computer program in which that data variable is accessed.

3. The method of 1, the method further comprising:
prior to the linking the plurality of object files into the specific binary file,
grouping data variables that are accessed with similar frequency from the same portion of the computer program,
assigning contiguous virtual address to the grouped data variables,
setting all references to the grouped data variables in the code section of the computer program to reflect the assigned contiguous virtual addresses,
modifying all references to the grouped data variables in the code section of the computer program to reflect the assigned virtual addresses,
re-writing the first binary file to reflect the new virtual addresses of the data variable, and
re-executing the first binary file to collect profile information.

4. The method of claim 1, wherein:
a plurality of data variables are allocated space in the data section of the computer program; and
reordering the data section of the computer program comprises:
determining a particular order for at least two of the plurality of data variables, wherein the particular order indicates an arrangement of the at least two data variables in the data section of the computer program; and
assigning virtual addresses to the at least two data variables according to the particular order.

5. The method of claim 4, wherein determining the particular order for the at least two data variables comprises:
based on the annotation information and the profile information, determining an access frequency with which each of the at least two data variables is accessed from the one or more portions of the computer program; and
based on the access frequency for each of the at least two data variables, determining whether a particular relationship exists between the at least two data variables.

6. The method of claim 5, wherein:
the particular relationship indicates that the at least two data variables are frequently accessed from the same portion of the one or more portions of the computer program; and in response to a determination that the particular relationship exists, then assigning virtual addresses to the at least two data variables further comprises assigning contiguous virtual addresses to the at least two data variables.

7. The method of claim 6, wherein:
the contiguous virtual addresses are selected to cause an operating system that executes the specific binary file to assign to the at least two data variables specific physical addresses, wherein:
when the operating system loads values from the specific physical addresses into a processor cache, the values are placed on the same cache line in the processor cache.

8. The method of claim 1, wherein:
a plurality of data variables are allocated space in the data section of the computer program;
a plurality of instructions are stored in a code section of the computer program, wherein a particular instruction of the plurality of instructions accesses a particular data variable of the plurality of data variables; and
reordering the data section of the computer program comprises:
assigning a first virtual address to the particular data variable, wherein the first virtual address is at a particular offset from a second virtual address that is assigned to the particular instruction.

9. The method of claim 8, further comprising:
based on the annotation information and the profile information, determining a particular frequency with which the particular instruction accesses the particular data variable from the one or more portions of the computer program;
determining whether the particular frequency is greater than a threshold frequency value; and
deciding to set the first virtual address at the particular offset from the second virtual address in response to a determination that the particular frequency is greater than the threshold frequency value.

10. The method of claim 8, further comprising:
determining the size of the particular offset, wherein the particular offset is such that the particular instruction does not clash with the particular data variable in a processor cache when processor cache lines, which store any one of the particular instruction and the particular data variable, are loaded into the processor cache during the execution of the specific binary file.

11. The method of claim 1, wherein:
a data variable is allocated space in the data section of the computer program;
an instruction is stored in a code section of the computer program, wherein the instruction references the data variable; and
reordering the data section of the computer program comprises:
assigning a virtual address to the data variable, wherein the virtual address references a space in the data portion of the computer program; and
modifying the instruction stored in the code section to reflect the virtual address assigned to the data variable.

12. A machine readable storage medium storing software instructions embodied therein for causing one or more processors to perform a method for reordering a data section associated with a computer program, the method comprising:
compiling the computer program into a plurality of object files that each include annotation information;
linking the plurality of object files into a first binary file that includes the annotation information from each object file, wherein the data section of the computer program that is stored in the first binary file is not reordered;
instrumenting the first binary file;
executing the first binary file to collect profile information;
based on the annotation information in the first binary file, generating at least one of control flow information and data flow information;
based on at least one of the control flow information and the data flow information, determining for each data variable an access frequency for that data variable from each portion of the computer program;
linking the plurality of object files into a specific binary file;
reordering the data section of the computer program, wherein the reordering comprises:
grouping data variables that are accessed with similar frequency from the same portion of the computer program,
assigning contiguous virtual addresses to the grouped data variables, and
setting all references to the grouped data variables in a code section of the computer program to reflect the assigned contiguous virtual addresses; and
storing the specific binary file, after generating the first binary file, that is a specific executable version of the computer program, wherein the specific binary file includes the data section of the computer program that has been reordered, and wherein the specific executable version is different than the first executable version,
wherein the reordering is based on at least the annotation information and the profile information.

13. The machine readable storage medium of claim 12, wherein:
the profile information comprises one or more counters associated with the one or more portions of the computer program, wherein a particular counter associated with a particular portion is incremented each time the particular portion is accessed during the execution of the first binary file; and
reordering the data section further comprises:
prior to the grouping, determining the access frequency for each data variable by summing all counters that are associated with portions of the computer program in which that data variable is accessed.

14. The machine readable storage medium of claim 12, the method further comprising:
prior to the linking the plurality of object files into the specific binary file, grouping data variables that are accessed with similar frequency from the same portion of the computer program,
assigning contiguous virtual address to the grouped data variables,
setting all references to the grouped data variables in the code section of the computer program to reflect the assigned contiguous virtual addresses,
modifying all references to the grouped data variables in the code section of the computer program to reflect the assigned virtual addresses,
re-writing the first binary file to reflect the new virtual addresses of the data variable, and
re-executing the first binary file to collect profile information.

15. The machine readable storage medium of claim 12, wherein:

a plurality of data variables are allocated space in the data section of the computer program; and reordering the data section of the computer program comprises:

determining a particular order for at least two of the plurality of data variables, wherein the particular order indicates an arrangement of the at least two data variables in the data section of the computer program; and assigning virtual addresses to the at least two data variables according to the particular order.

16. The machine readable storage medium of claim 15, wherein determining the particular order for the at least two data variables comprises:

based on the annotation information and the profile information, determining an access frequency with which each of the at least two data variables is accessed from the one or more portions of the computer program; and determining whether a particular relationship exists between the at least two data variables based on the access frequency for each of the at least two data variables.

17. The machine readable storage medium of claim 16, wherein:

the particular relationship indicates that the at least two data variables are frequently accessed from the same portion of the one or more portions of the computer program; and assigning virtual addresses to the at least two data variables further comprises assigning contiguous virtual addresses to the at least two data variables in response to a determination that the particular relationship exists.

18. The machine readable storage medium of claim 17, wherein:

the contiguous virtual addresses are selected to cause an operating system that executes the specific binary file to assign to the at least two data variables specific physical addresses, wherein:

when the operating system loads values from the specific physical addresses into a processor cache, the values are placed on the same cache line in the processor cache.

19. The machine readable storage medium of claim 12, wherein:

a plurality of data variables are allocated space in the data section of the computer program;

a plurality of instructions are stored in a code section of the computer program, wherein a particular instruction of the plurality of instructions accesses a particular data variable of the plurality of data variables; and reordering the data section of the computer program comprises:

assigning a first virtual address to the particular data variable, wherein the first virtual address is at a particular offset from a second virtual address that is assigned to the particular instruction.

20. The machine readable storage medium of claim 19, further comprising:

based on the annotation information and the profile information, determining a particular frequency with which the particular instruction accesses the particular data variable from the one or more portions of the computer program;

determining whether the particular frequency is greater than a threshold frequency value; and deciding to set the first virtual address at the particular offset from the second virtual address in response to a determination that the particular frequency is greater than the threshold frequency value.

21. The machine readable storage medium of claim 19, further comprising:

determining the size of the particular offset, wherein the particular offset is such that the particular instruction does not clash with the particular data variable in a processor cache when processor cache lines, which store any one of the particular instruction and the particular data variable, are loaded into the processor cache during the execution of the specific binary file.

22. The machine readable storage medium of claim 12, wherein:

a data variable is allocated space in the data section of the computer program;

an instruction that references the data variable is stored in a code section of the computer program; and reordering the data section of the computer program comprises:

assigning a virtual address to the data variable, wherein the virtual address references a space in the data portion of the computer program; and modifying the instruction stored in the code section to reflect the virtual address assigned to the data variable.

* * * * *